United States Patent Office 2,760,747
Patented Aug. 28, 1956

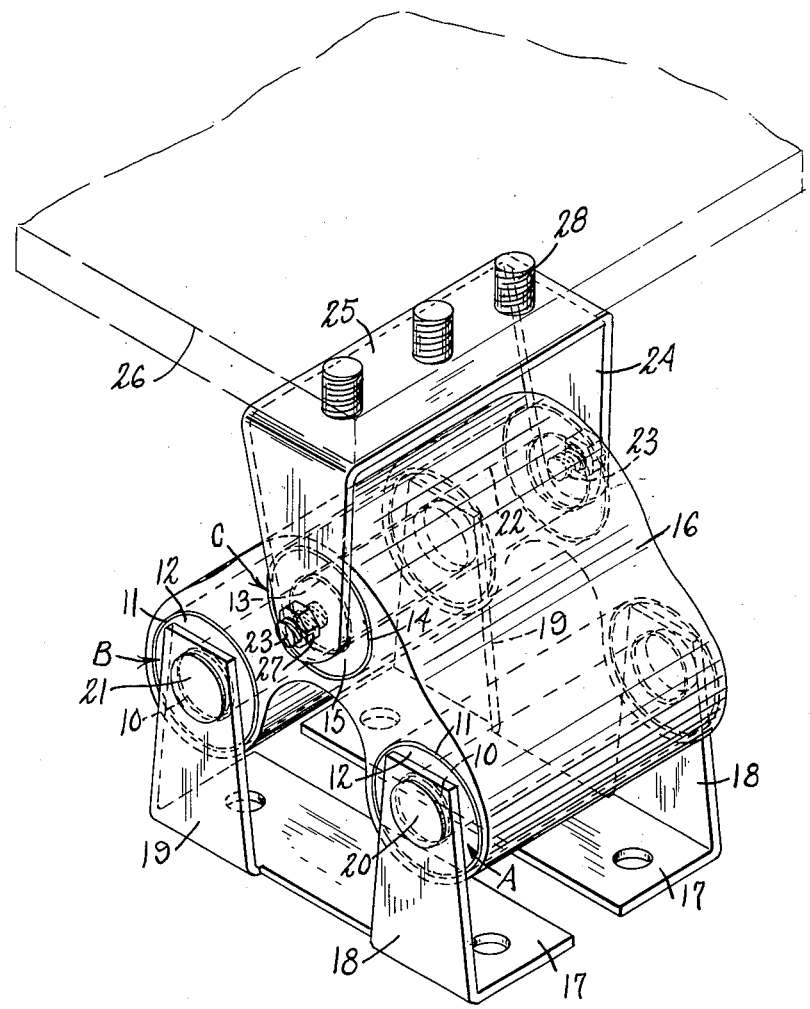

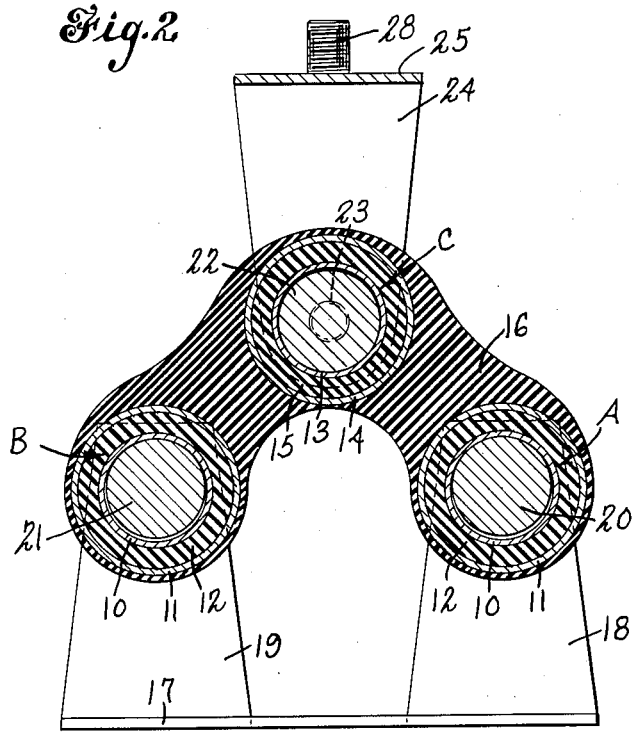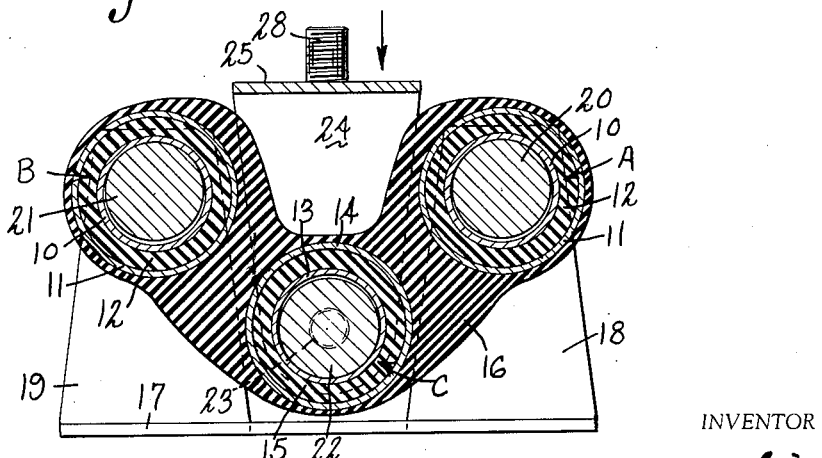

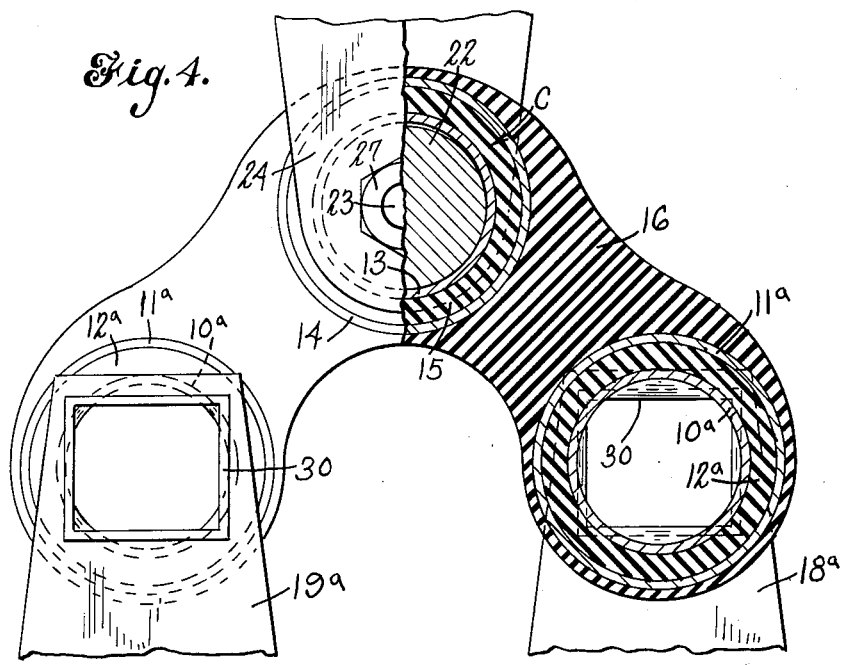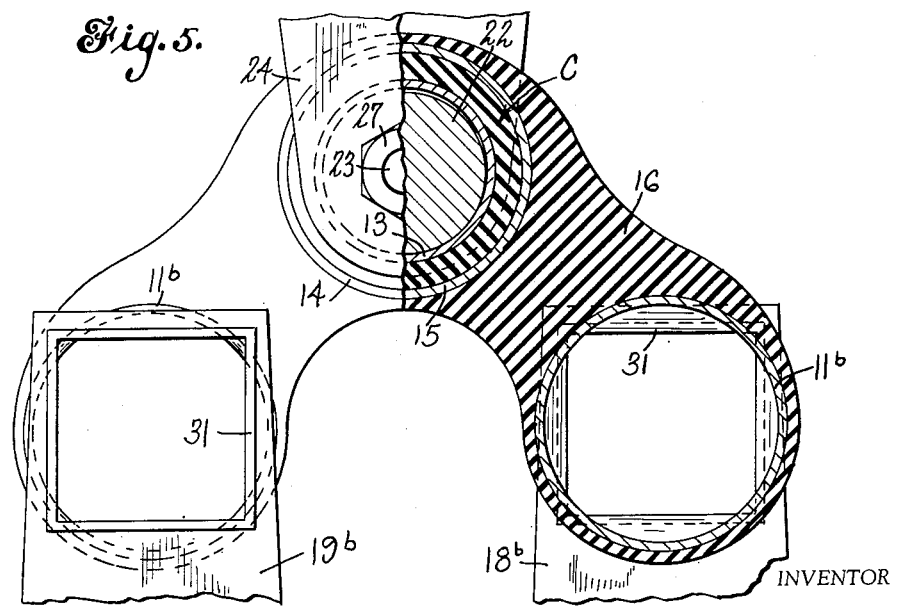

2,760,747

SHOCK MOUNT

Walter J. Mordarski, Branford, Conn., assignor to The Connecticut Hard Rubber Company, New Haven, Conn., a corporation of Connecticut Application October 14, 1953, Serial No. 386,029

9 Claims. (Cl. 248—358)

This invention relates to anti-vibration or shock mounts and more particularly to a mount or means for supporting a relatively heavy object during transportation thereof.

It sometimes occurs that when heavy objects are transported from place to place the shocks or vibrations to which they are subjected cause damage to part of the mechanism. This is particularly true, for example, when such objects as engines or other heavy machinery having delicate bearings are transported from place to place by rail or truck. This has resulted in damage to the bearings which might have been avoided if the mechanism had been mounted on suitable supports which could withstand vibration and shock without placing too high a peak load on the mounted unit.

It is desirable in constructing a support or mount for the described purpose to provide a structure that will absorb a large amount of energy without placing too high a peak load upon the mounted unit and without making the resilient element so soft as to allow excessively large deflections and very low natural frequencies. In the present instance a rubber or rubber-like material is employed between the supporting structure and the load-carrying structure to absorb the shock.

In the specific embodiment of the invention illustrated, the supporting structure comprises a pair of spaced horizontal members, and the load-carrying structure comprises a single horizontally disposed member normally positioned above the supporting members and midway between them. A body of rubber or rubber-like compressible material connects the supporting members with the load-carrying member, and the dimensions of the various elements is so related to the spacing of the two supporting elements that the load-carrying member, when subjected to a sufficient load, may be forced downwardly between the load-carrying members.

The rubber or other compressible resilient material between the supporting members and the load-carrying member is so constructed that when a load deflection curve is plotted, it will be a non-linear curve and will tend to flatten out when a load of a predetermined amount is reached, the deflection increasing rapidly from this point with a small increase in load. In certain instances this curve even drops under a predetermined load. As the energy absorbed by the mount is equal to the load times the deflection, it will be seen that when the load deflection curve is substantially flat a large amount of energy is absorbed without placing too great a peak load upon the mounted unit.

As illustrated, the load-carrying member and also the supporting members consist of hollow cylindrical bodies arranged with their axes at the apices of a triangle and connected by the body of rubber or rubber-like compressible material. In certain instances an inner cylindrical element is placed within each of the supporting and load-carrying members, this inner cylindrical element being of such diameter that it is spaced from the inner surface of the member within which it is mounted, and the space between the inner and outer elements is filled with a rubber or rubber-like compressible material to provide added shock resistance, particularly against lateral play or movement in order to resist shock in a lateral or horizontal direction.

The rubber or rubber-like material employed is resilient and elastic and may comprise natural rubber, one of the organic synthetic rubbers, or silicone rubber. The same material may be used to connect the load-carrying member with each of the supporting members as is used between the inner and outer cylindrical members positioned at the apices of the triangular unit.

One object of the invention is to provide a new and improved resilient shock mount for supporting a load to prevent shock or vibration damage to the supported load.

Still another object of the invention is to provide a mount for supporting a load which may be subjected to shock or vibration so that a large amount of energy will be absorbed by the mount itself without placing too great a load upon the supported unit.

A still further object of the invention is to provide a vibration-damping mounting comprising a laterally extending load-carrying member and a pair of supporting members, the latter being spaced apart a distance greater than the lateral dimension of the load-carrying member, and a body of elastic material connecting the three members and normally supporting the load-carrying member above the spaced supporting members.

To these and other ends the invention consists in the novel features and combinations of parts to be hereinafter described and claimed.

In the accompanying drawings:

Fig. 1 is a perspective view of a shock mount embodying my invention;

Fig. 2 is a vertical sectional view through the shock mount before the application of a load thereto;

Fig. 3 is a view similar to Fig. 2 but showing the extreme position of the shock mount when carrying a predetermined load;

Fig. 4 is a side elevational view of a mount of modified construction, the parts being shown partly in section; and Fig. 5 is a view similar to Fig. 4 showing a further modification.

To illustrate a preferred embodiment of my invention, I have shown in the drawings a vibration-damping mounting comprising a pair of supporting members A and B, each consisting of an inner cylindrical tubular element 10 and an outer cylindrical tubular element 11. These elements are elongated, the length depending upon the conditions required to be met. In a given instance, for example, they may be approximately 4 inches in length, and the elements A and B being spaced apart substantially 4 inches on centers.

Between the inner and outer tubular members 10 and 11 is a hollow cylindrical body 12 of rubber or rubber-like compressible material so as to permit a certain amount of play or movement in all directions between the cylindrical members 10 and 11 as well as relative turning or twisting movement of these members. The rubber body 12 will be bonded to the outer surface of the inner cylindrical member and the inner surface of the outer cylindrical member according to well-understood practice.

An upper load-carrying member C is constructed similarly to the members A and B and likewise comprises inner and outer hollow cylindrical members 13 and 14, these members being disposed in spaced relation, and the space between them occupied by an elastic compressible rubber or rubber-like body 15.

As illustrated, the three members A, B and C are placed as shown in Fig. 2 so that each of these elements is positioned substantially at the apex of a triangle, and these three members are connected together by a body 16 of inverted V-shaped form and of rubber or rubber-like compressible elastic material. This material embraces and is bonded to the outer surfaces of the cylindrical tubular elements 11 and 14 in a well-known manner, and the material will be of sufficient stiffness or rigidity to support a predetermined load with a given deflection.

As will be apparent from Figs. 2 and 3, the diameter of the outer tubular element 14 will be so related to the spacing of the supporting units A and B that the load-carrying unit C may be forced downwardly between the supporting units A and B even though the latter are held in fixed positions and against any lateral spread.

The unit above described may be supported in any suitable manner. To this end there is disclosed a pair of supporting brackets, each having a base 17 and upright legs 18 and 19, one of these brackets being positioned on each side of the unit, as shown more especially in Fig. 1. A rod 20 may be passed through the bore of the inner cylinder member 10 of the unit A and positioned in openings in the legs 18, while a similar rod 21 is passed through the inner member 10 of the unit B and supported in openings in the legs 19. The bases 17 of the brackets may be secured to any suitable supporting member, and these brackets serve as a fixed support for the units A and B to prevent relatively lateral or horizontal movement of these units and hold them against spreading. The rods 20 and 21 fit comparatively snugly within the members 10 but may allow turning of these members when the mount is subjected to load.

Likewise, a rod 22 may be passed snugly through the inner tubular member 13 of the upper unit C, this rod having reduced ends 23 upon which is mounted a yoke or clevis 24 having an upper surface 25 upon which the load, diagrammatically shown at 26, may be supported. The yoke 24 may be held in place by nuts 27, and the portion 25 of the yoke may be provided with threaded studs or the like 28 by which the load may be secured in place.

When a load is supported by the yoke 24, the load-carrying unit C is depressed, thus moving this unit downwardly with respect to the supporting units A and B. In the present instance it will be apparent that as the unit C moves downwardly, the outer cylindrical members 11 may be caused to turn or twist relatively to the members 10, and likewise the entire units A and B (each consisting of the inner and outer members 10 and 11 and the rubber body 12) may be caused to rotate or turn to some extent with respect to the rods 20 and 21. If the load is sufficiently great, the unit C may be forced downwardly between the units A and B to the extreme position shown in Fig. 3 in which the rubber body 16, which was of inverted V shape in cross section as shown in Fig. 2, has become substantially V shaped in cross section, as shown in Fig. 3. It has been found that with this construction, this shock mount gives a load deflection curve which is substantially linear for relatively light loads, but upon the application of heavy loads, the curve flattens out, and the increase in deflection becomes relatively great with a relatively small increase in the load. Thus when the supported weight is subjected to shocks in a vertical direction, this shock is borne by a relatively great deflection of the rubber body and prevents the subjecting of the supported body to a high peak load.

In Fig. 4 of the drawings, I have shown a shock mount which is similar in many respects to that described above in connection with Figs. 1 to 3. In this instance, however, the inner tubular members 10$^a$ of the lower supporting units are provided with squared or polygonal end portions 30, these end portions being supported in similarly shaped openings in the legs 18$^a$ and 19$^a$ of the supporting brackets. The construction of the upper unit C is the same as that illustrated and described in connection with Figs. 1 to 3.

In this manner the inner tubular members 10$^a$ of the supporting units A and B are held against turning movement relatively to the supports although the outer cylindrical elements 11$^a$ will have some turning or twisting movement as permitted by the rubber body 12$^a$ between the inner and outer units. This provides a somewhat stiffer support than that previously described as the relative movement of the units A and B will be more limited than in the modification previously described. The load deflection curve of the unit shown in Fig. 4 will, therefore, reach a higher point before flattening out.

In Fig. 5 of the drawings a further modification of the invention is illustrated wherein the upper load-carrying unit C is of the same construction as shown and described in connection with Figs. 1 to 4. In this modification of my invention, however, the lower supporting units have been modified in that the inner cylindrical tubular members have been omitted, and each of the lower supporting units consists of a hollow (it may be solid if desired) cylindrical member 11$^b$ which is embraced by a portion of the rubber body 16, the latter being bonded to the member 11$^b$. In this instance each of the members 11$^b$ is provided with squared ends 31 to be received in similarly shaped openings in the legs 18$^b$ and 19$^b$ so that these supporting members are rigidly held against rotation as well as against spreading. In this instance no rotation of the lower supporting units is permitted, the movement of the upper unit being accommodated entirely by displacement of the rubber body 16 which is of the same form and material as that previously described.

In the modification shown in Fig. 5 of the drawings, a still stiffer mounting unit is provided which will carry a still higher load before the load deflection curve flattens out or drops to provide a greater deflection for a relatively small increase in load.

It will be understood that the tubular cylindrical members such as 10 and 11 in Figs. 2 and 3 of the drawings, as well as the members 13 and 14, are of rigid character such as steel tubes, for example, so that they may properly serve their supporting functions.

While I have shown and described some preferred embodiments of my invention, it will be understood that it is not to be limited to all of the details shown, but is capable of modification and variation within the spirit of the invention and within the scope of the claims.

What I claim is:

1. A shock mount comprising a pair of substantially parallel spaced supporting elements, a third element disposed above and in staggered position between said first-named elements, a body of elastic material of substantially inverted V-shaped form in cross section connecting all of said elements, and each of said three elements comprising an outer hollow elongated member and an inner elongated member disposed within said outer member and spaced from the wall thereof, and a body of compressible rubber material filling the space between said members and bonded to both thereof.

2. A shock mount comprising a pair of substantially parallel spaced supporting elements, a third element disposed above and in staggered position between said first-named elements, a body of elastic material of substantially inverted V-shaped form in cross section connecting all of said elements, and said third element comprising a hollow elongated outer member, an inner member disposed within the outer member in spaced relation to the inner wall thereof, and a body of compressible elastic material between said inner and outer members and bonded to both thereof.

3. A shock mount as in claim 2 wherein a supporting means is provided for said pair of elements, and said third element is provided with load-carrying means.

4. A shock mount as in claim 3 wherein said pair of elements is supported by said supporting means for rotative movement relatively thereto.

5. A shock mount as in claim 3 wherein said pair of elements is rigidly supported by said supporting means so as to be held against rotative movement relatively thereto.

6. A shock mount as in claim 1 wherein a supporting means is loosely connected to the inner members of said pair of elements to support them and permit rotative movement thereof.

7. A shock mount comprising a pair of substantially parallel spaced supporting elements, a third element disposed above and in staggered position between said first-named elements, a body of elastic material of substantially inverted V-shaped form in cross section connecting all of said elements, each of said three elements comprising an outer hollow elongated member and an inner elongated member disposed within said outer member and spaced from the wall thereof, a body of compressible rubber material filling the space between said members and bonded to both thereof, and supporting means fixedly secured to the inner members of said pair of elements to support said inner members against rotation but permitting limited rotation of the outer members.

8. A shock mount comprising a pair of substantially parallel spaced elongated elements, a third elongated element disposed parallel to the first two elements and above and in staggered relation between the same, whereby the axis of each of said elements is substantially at the vertex of a triangle, a body of elastic material of substantially inverted V-shaped form in cross section connecting said elements and embracing the same and being bonded to the outer surfaces thereof, the transverse horizontal dimension of said third element being smaller than the distance between the adjacent surfaces of the elements of said pair, means for supporting said pair of elements, and cushioning means between said pair of elements and their supporting means to permit lateral displacement thereof.

9. A shock mount comprising a pair of substantially parallel spaced supporting elements, a third element disposed above and in staggered position between said first-named elements, a body of elastic material of substantially inverted V-shaped form in cross section connecting all of said elements, supporting means connected to said first-named elements to support the same and limit lateral separation thereof, each of said first-named elements comprising a hollow elongated member supported for rotative movement relatively to the supporting means, and cushioning means between said hollow elongated members and their supporting means to permit relative lateral movement of said members relatively to the supports.

References Cited in the file of this patent
UNITED STATES PATENTS

| | | |
|---|---|---|
| 2,147,660 | Loewus | Feb. 21, 1939 |
| 2,440,670 | Kaemmerling | Apr. 27, 1948 |
| 2,478,108 | Kaemmerling | Aug. 2, 1949 |
| 2,509,769 | Hirst | May 30, 1950 |
| 2,647,717 | Norris et al. | Aug. 4, 1953 |